United States Patent
Son (10) Patent No.: US 9,989,113 B2
(45) Date of Patent: Jun. 5, 2018

(54) ELECTRONIC PARKING BRAKE

(71) Applicant: MANDO CORPORATION, Pyeongtaek-si, Gyeonggi-do (KR)

(72) Inventor: Jong-Gu Son, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days. days.

(21) Appl. No.: 14/737,215

(22) Filed: Jun. 11, 2015

(65) Prior Publication Data
US 2015/0362032 A1 Dec. 17, 2015

(30) Foreign Application Priority Data
Jun. 13, 2014 (KR) .......................... 10-2014-0072125

(51) Int. Cl.
*F16D 65/18* (2006.01)
*F16D 55/226* (2006.01)
(Continued)

(52) U.S. Cl.
CPC ............ *F16D 65/18* (2013.01); *F16D 55/226* (2013.01); *F16D 2121/24* (2013.01); *F16D 2125/40* (2013.01); *F16D 2125/50* (2013.01)

(58) Field of Classification Search
CPC ............ F16D 2125/50; F16D 2125/40; F16D 2121/24; F16D 55/226; F16D 55/08; F16F 65/18; F16F 65/183; F16H 9/26
(Continued)

(56) References Cited

U.S. PATENT DOCUMENTS

| 7,721,853 B2 * | 5/2010 | Chittka ................... F16D 65/18 188/162 |
| 8,852,048 B2 * | 10/2014 | Shelef ................... F16H 49/001 475/331 |
| 2012/0046140 A1 | 2/2012 | Shelef et al. |

FOREIGN PATENT DOCUMENTS

| CN | 103032491 A | 4/2013 | |
| DE | 3842440 A1 * | 8/1989 | ............... F16H 7/00 |

(Continued)

OTHER PUBLICATIONS

Perneder et al., "Handbook Timing Belts Principles, Calculations, Applications", 2012, Springer-Verlag, Chapter 3, Section 3.1 Belt Drive Geometries, p. 107-118.*
(Continued)

*Primary Examiner* — Anna M Momper
(74) *Attorney, Agent, or Firm* — McDermott Will & Emery LLP (57) ABSTRACT

Disclosed herein is an electronic parking brake including: a carrier fixed to a body of a vehicle; a caliper housing that is slidably installed in the carrier; a motor that is disposed at an outside of the caliper housing and generates a rotational force; a decelerator that amplifies the rotational force of the motor; and a conversion unit that converts a rotational force transmitted from the decelerator into a rectilinear motion, wherein the decelerator includes a belt planetary gear part, and the belt planetary gear part includes: a solar gear rotated by receiving the rotational force of the motor; a belt gear engaged with the solar gear; a transmission plate that is connected to the belt gear and has belt support parts for supporting the belt gear so that the belt gear is rotatable; and a ring gear that is engaged with an outer surface of the belt gear and fixed to the belt gear so as to rotate the transmission plate.

5 Claims, 8 Drawing Sheets

(51) Int. Cl.
*F16D 121/24* (2012.01)
*F16D 125/50* (2012.01)
*F16D 125/40* (2012.01)

(58) Field of Classification Search
USPC .................................................. 474/148–150
See application file for complete search history.

(56) References Cited

FOREIGN PATENT DOCUMENTS

| KR | 10-2013-0038432 A | 4/2013 | |
|---|---|---|---|
| WO | 98/32993 A1 | 7/1998 | |
| WO | WO 9832993 A1 * | 7/1998 | ............... F16H 9/26 |

OTHER PUBLICATIONS

Chinese Office Action issued in Application No. 2015-10324523.6 dated Nov. 16, 2017, with English translation.

* cited by examiner

ELECTRONIC PARKING BRAKE

CROSS-REFERENCE TO RELATED APPLICATION

This application claims the benefit of Korean Patent Application No. 2014-0072125, filed on Jun. 13, 2014 in the Korean Intellectual Property Office, the disclosure of which is incorporated herein by reference.

BACKGROUND

1. Field

Embodiments of the present invention relate to an electronic parking brake, and more particularly, to a decelerator to which a belt gear for an electronic parking brake for a vehicle is applied.

2. Description of the Related Art

In general, parking brakes are devices that stop vehicles such that the vehicles are not moved when the vehicles are parked, and serve to hold wheels of the vehicle such that the wheels are not rotated.

Electronic parking brake (EPB) systems for electronically controlling driving of a parking brake are recently used. These EPB systems are mounted on general disk brakes and perform a function of the parking brake. Here, examples of the EPB systems include cable puller type EPB systems, motor-on-caliper type EPB systems, and hydraulic parking brake type EPB systems.

Korean Unexamined Patent Application Publication No. 10-2013-0038432 discloses a motor-on-caliper type electronic parking brake. Referring to the disclosed literature, the electronic parking brake includes a disk that rotates together with wheels of a vehicle, a carrier having a pair of pad plates located at both sides of the disk to press the disk, a caliper housing that is slidably installed in the carrier and has a piston installed to advance and retreat to press the pair of pad plates, the piston being built in the caliper housing, a motor that generates a driving force, a decelerator that amplifies a driving force generated by a motor, a gear assembly that transfers the driving force of the motor to the decelerator, and a conversion unit that transfers a rotational force of the motor to the piston from the decelerator.

The pair of pad plates may be classified into an inner pad plate adjacent to the piston and an outer pad plate disposed at an opposite side to the inner pad plate.

A cylinder is disposed on one side of the caliper housing, and the piston that presses the inner pad plate toward the disk is installed in the cylinder. A finger part that is bent downward on the other side of the caliper housing is connected integrally with the cylinder, and is capable of pressing the outer pad plate toward the disk together with sliding movement of the caliper housing.

The carrier is fixed to a body of the vehicle, prevents escape of the pair of pad plates, and is disposed to guide the pair of pad plates toward and away from the disk.

The piston performs a rectilinear reciprocal motion through driving of the motor when a brake operation is performed and presses the inner pad plate toward the disk. A driving force of the motor is transferred to the decelerator using the gear assembly and is transferred to the piston using the conversion unit in a state in which the driving force is amplified by the decelerator.

The conversion unit serves to press the piston toward the inner pad plate, as described above. The conversion unit includes a spindle member which is screw-coupled to a rotation shaft of the carrier of the decelerator that will be described later and which receives a rotational force of the motor, and a nut member that is screw-coupled to the spindle member and presses the piston. In this case, a bearing is installed in the cylinder to support the spindle member.

The gear assembly includes a driving gear installed at a shaft of the motor, a driven gear connected to the decelerator, and a pinion idle gear that connects the driving gear and the driven gear. That is, a rotational force generated when the shaft of the motor is rotated is transferred to the driven gear through the pinion idle gear meshed between the driving gear and the driven gear.

Meanwhile, the gear assembly is configured to transfer the rotational force of the motor through a plurality of gears or to transfer the rotational force through a belt pulley, as mentioned above.

The decelerator is configured to have a two-stage planetary gear shape. That is, the decelerator includes a first decelerator part, a second decelerator part, and internal gears.

The first decelerator part includes a first solar gear installed on a central shaft of the driven gear, a plurality of first planetary gears disposed around the first solar gear to be meshed with the first solar gear, and a first carrier connected to shafts of the plurality of first planetary gears.

The second decelerator part has the same structure as that of the first decelerator part. That is, the second decelerator part includes a second solar gear installed on a rotation shaft of a first carrier, a plurality of second planetary gears disposed around the second solar gear to be meshed with the second solar gear, and a second carrier connected to shafts of the plurality of second planetary gears, wherein a rotation shaft of the second carrier is connected to the conversion unit. In this case, the first and second planetary gears are meshed with the internal gears fixed to the outside.

That is, in the above-described electronic disk brake, the rotational force is transferred to the decelerator using the gear assembly by an operation of the motor. Thus, the second planetary gears meshed with the fixed internal gears revolve when the first solar gear is rotated, and the revolution of the second planetary gears is transferred to the second decelerator part through the first carrier. Also, the second decelerator part transfers the rotational force to the spindle member by performing the same operation as that of the first decelerator part so that deceleration rotation of the spindle member can be performed. When the spindle member is rotated, axial movement of the nut member is performed, and the nut member presses the piston so that the brake operation can be performed.

However, the above-described electronic parking brake has a structure in which the driving force of the motor is primarily decelerated using the gear assembly or the belt pulley structure, is finally decelerated using the decelerator having the two-stage planetary gear shape, and is converted into a rectilinear force using the conversion unit to generate a brake force, i.e., a U-shaped power transmission structure so that the sizes of the cylinder, the carrier and the power transmission unit (motor, gear assembly, and decelerator) are increased when the disk brake is mounted on the vehicle and thus, there is a problem of limitation in that the disk brake needs to be installed in only a midsize or more vehicle.

Also, alignment of the entire brake system is displaced by an axial reaction of the motor when the brake operation is performed by gears configured in multi-stages. Thus, noise occurs in the motor or decelerator, and the life span of the motor is reduced.

Thus, various researches and developments on improvements in utility of an installation space for the electronic parking brake that automatically operates the brake using the motor, or a reduction in operating noise have been carried out.

SUMMARY

Therefore, it is an aspect of the present invention to provide an electronic parking brake in which a structure of components of a decelerator that transfers a driving force and a connection structure between the components are improved so that a volume of the electronic parking brake can be reduced, an operating noise can be reduced and the electronic parking brake can operate smoothly.

Additional aspects of the invention will be set forth in part in the description which follows and, in part, will be obvious from the description, or may be learned by practice of the invention.

In accordance with one aspect of the present invention, an electronic parking brake includes: a carrier fixed to a body of a vehicle; a caliper housing that is slidably installed in the carrier; a motor that is disposed at an outside of the caliper housing and generates a rotational force; a decelerator that amplifies the rotational force of the motor; and a conversion unit that converts a rotational force transmitted from the decelerator into a rectilinear motion, wherein the decelerator may include a belt planetary gear part, and the belt planetary gear part may include: a solar gear rotated by receiving the rotational force of the motor; a belt gear engaged with the solar gear; a transmission plate that is connected to the belt gear and has belt support parts for supporting the belt gear so that the belt gear is rotatable; and a ring gear that is engaged with an outer surface of the belt gear and fixed to the belt gear to rotate the transmission plate.

The transmission plate may further include a tension adjustment part that presses an outer surface of the belt gear inward to provide tension to the belt gear.

Teeth may be formed on an inside and an outside of the belt gear, and an interval between the teeth formed on the inside and the outside of the belt gear may be selectively increased/decreased by a required gear ratio.

The belt support parts may be fixed to the transmission plate, and the belt gear may slide on the belt support parts, may be rotated, and may transfer a rotational force to the transmission plate when the belt gear operates.

The belt support parts may be fixed to the transmission plate and may be disposed to be rotatable from the transmission plate, and the belt gear may be engaged with the belt support parts, may be rotated, and may transfer a rotational force to the transmission plate when the belt gear operates.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. The following embodiment is proposed to sufficiently convey the spirit of the invention to one of ordinary skill in the art. The invention is not limited by the proposed embodiment but may be embodied in different shapes. In the drawings, for clarity, illustration of unrelated parts to description is omitted, and for understanding, sizes of components may be slightly exaggerated.

Figure 1:
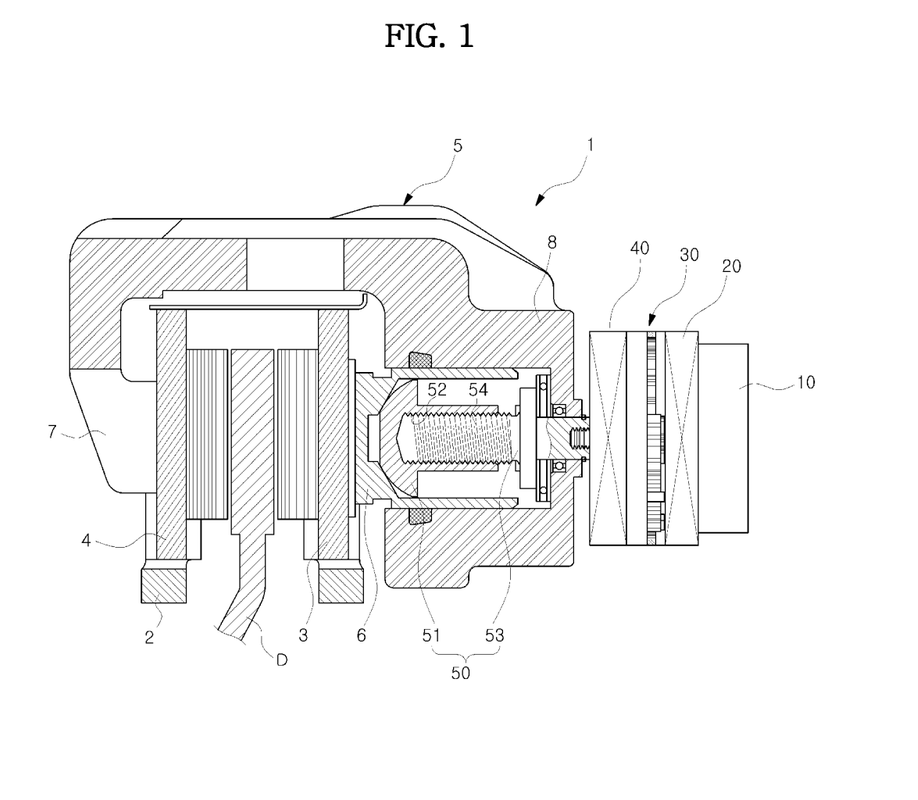
FIG. 1 is a side cross-sectional view schematically illustrating an electronic parking brake in accordance with an embodiment of the present invention.

FIG. 1 is a side cross-sectional view illustrating an electronic parking brake 1 in accordance with an embodiment of the present invention.

Referring to FIG. 1, the electronic parking brake 1 includes a disk D that rotates together with wheels (not shown) of a vehicle, a carrier 2 having a pair of pad plates 3 and 4 disposed to perform a brake operation by pressing both side surfaces of the disk D, the pair of pad plates 3 and 4 being installed in the carrier 2, a caliper housing 5 in which a piston 6 installed to advance and retreat to press the pair of pad plates 3 and 4 is built, a motor 10 that generates a driving force, a conversion unit 50 that converts a rotational force of the motor 10 into a rectilinear reciprocal motion and presses the piston 6, and decelerators 20, 30, and 40 that are disposed between the motor 10 and the conversion unit 50, decelerate the rotational force of the motor 10 and transfer the decelerated rotational force to the conversion unit 50.

The pair of pad plates 3 and 4 include an inner pad plate 3 disposed to contact the piston 6 and an outer pad plate 4 disposed to contact a finger part 7 that will be described later. The pair of pad plates 3 and 4 are installed in the carrier 2 fixed to a body of the vehicle to advance toward and retreat from both side surfaces of the disk D, and the caliper housing 5 is also installed in the carrier 2 so as to slide in a pressing direction of the pair of pad plates 3 and 4.

A cylinder 8 having the piston 6 built therein is disposed behind the caliper housing 5, and the finger part 7 that is formed to be bent downward to operate the outer pad plate 4 is formed integrally with the cylinder 8.

The piston 6 is disposed to have a cylindrical shape in which an inside of the piston 6 is recessed in a cup shape. The piston 6 is slidably inserted into the cylinder 8. The piston 6 presses the inner pad plate 3 toward the disk D by an axial force of the conversion unit 50 which receives a rotational force of the motor 10.

The conversion unit 50 serves to press the piston 6 toward the inner pad plate 3, as described above, and is disposed in the cylinder 8. The conversion unit 50 includes a nut member 51 having a female screw part 52 formed therein, and a spindle member 53 having a male screw part 54 screw-coupled to the female screw part 52 of the nut member 51.

The spindle member 53 is installed to penetrate the rear of the cylinder 8 and is rotatably disposed in the cylinder 8 to be parallel to a direction in which the nut member 51 advances and retreats. In order to support the spindle member 53, a plurality of bearings are installed in the cylinder 8 to be spaced from one another. In this case, the plurality of bearings disposed between the spindle member 53 and a rear wall of the cylinder 8 are thrust bearings and receive a reaction generated when the nut member 51 is moved in advance and retreat directions when a brake operation is performed using the spindle member 53. Rotation of the nut member 51 is limited so that the nut member 51 may be disposed to be in contact with the piston 6.

The motor 10 has a rotation shaft and generates a rotational force in a forward/reverse direction to rotate the spindle member 53 of the conversion unit 50. The motor 10 is installed in a cover housing (not shown) fixed to the rear of the caliper housing 5.

Figure 2:
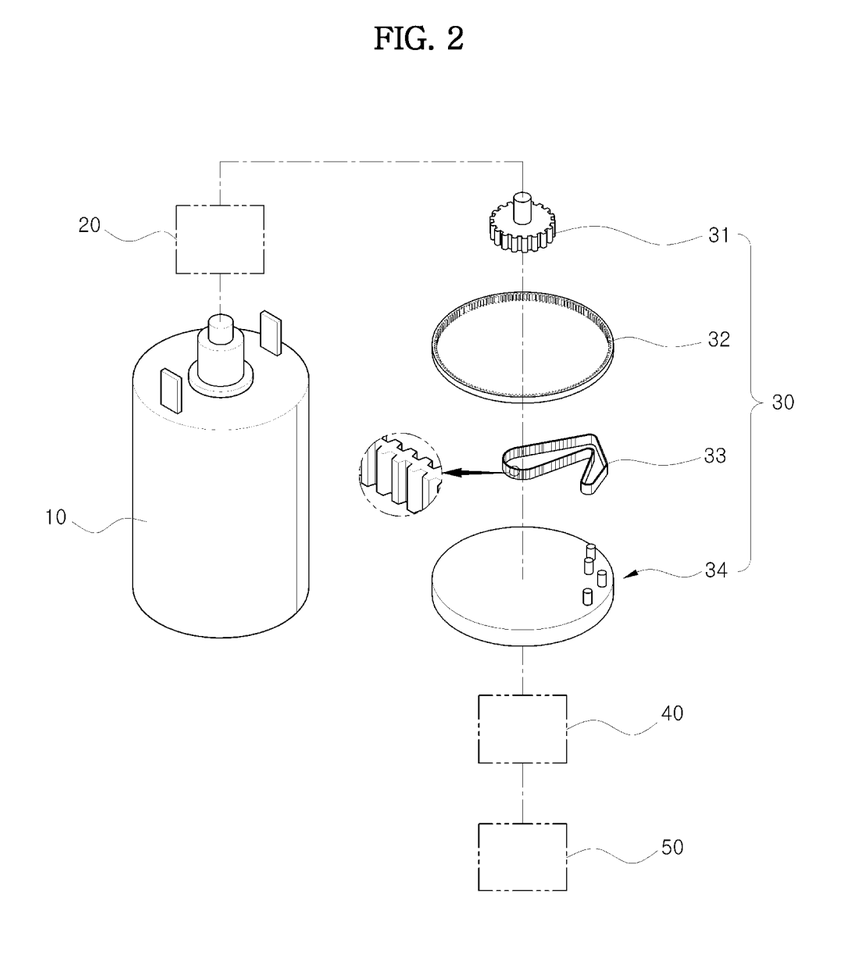
FIG. 2 is an exploded perspective view schematically illustrating a coupling state in which a belt planetary gear part is applied to the electronic parking brake in accordance with an embodiment of the present invention.

Meanwhile, the motor 10 is connected to an electronic control unit (ECU) (not shown) for controlling the motor 10, and an operation of the motor 10 is controlled by the ECU (not shown). For example, the ECU controls several operations of the motor 10, such as driving and stopping, forward rotation, and reverse rotation of the motor 10, using input signals transmitted according to a drivers instructions. When brake operation instructions or brake release instructions are applied by the driver, the ECU rotates the motor 10 in the forward or reverse direction. Also, the ECU may be configured to control the motor 10 using the number of revolutions detected by a counter sensor for counting the number of revolutions or a current amount detected by a current sensor by providing the counter sensor or the current sensor. Controlling the motor 10 using the ECU is a well-known technology and thus, a detailed description thereof will be omitted. The decelerators 20, 30, and 40 according to an embodiment of the present invention include a first decelerator part 20, a second decelerator part 40, and a belt planetary gear part 30. The first decelerator part 20 and the second decelerator part 40, which will be described later, may also be selectively removed. FIG. 2 is an exploded perspective view schematically illustrating a coupling state in which a belt planetary gear part is applied to the electronic parking brake in accordance with an embodiment of the present invention.

Referring to FIG. 2, a rotational force generated by the motor 10 is amplified by the decelerators 20, 30, and 40 and then is transferred to the conversion unit 50.

The decelerators 20, 30, and 40 may be disposed to have various configurations having a deceleration function, and a plurality of decelerators may be disposed. In an embodiment of the present invention, the decelerators 20, 30, and 40 include a belt planetary gear part 30 as one of the configurations having the deceleration function. Only the configuration will be described in detail.

Thus, a second decelerator part 40 which receives the decelerated rotational force using the first decelerator part 20 and the belt planetary gear part 30 before the rotational force of the motor 10 is transferred to the belt planetary gear part 30 is not limited and may be applied in various ways. Also, the rotational force of the motor 10 may be decelerated using only the belt planetary gear part 30 without the first decelerator part 20 and the second decelerator part 40 and then may be transferred to the conversion unit 50.

The rotational force amplified by the decelerators 20, 30, and 40 is transferred to the conversion unit 50. The conversion unit 50 converts the rotational force into a rectilinear motion, as described above, so that the electronic parking brake 1 may perform a brake operation.

Hereinafter, the belt planetary gear part 30 of the electronic parking brake 1 according to an exemplary embodiment of the present invention will be described with reference to FIGS. 3 through 5.

Figure 3:
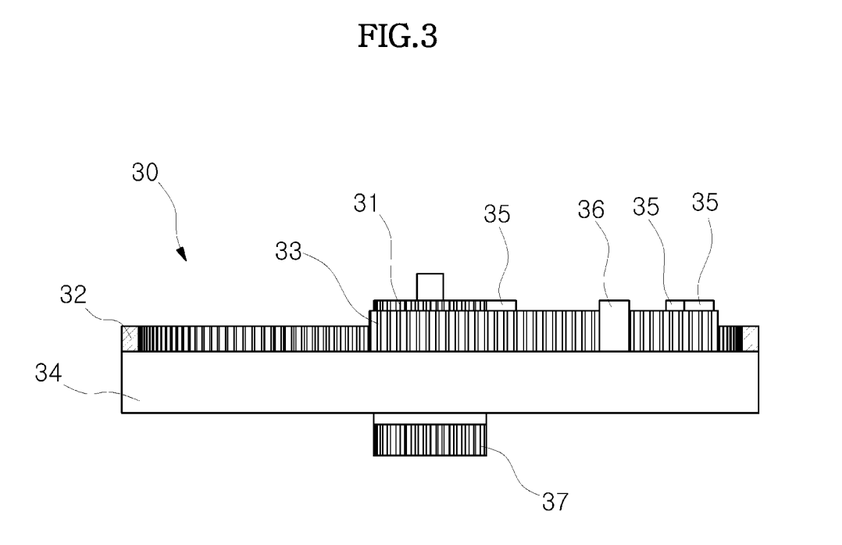
FIG. 3 is a side cross-sectional view schematically illustrating a coupling state of the belt planetary gear part of the electronic parking brake in accordance with an embodiment of the present invention.
Figure 4:
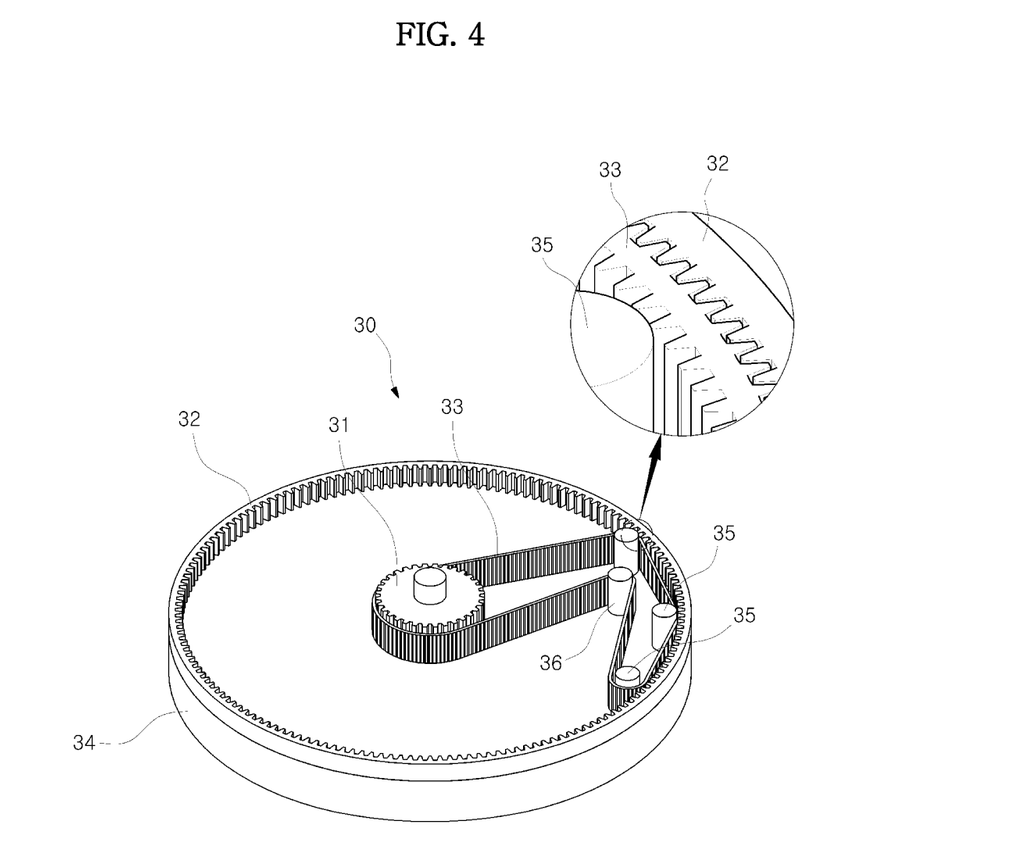
FIG. 4 is a perspective view schematically illustrating a coupling state of the belt planetary gear part of the electronic parking brake in accordance with an embodiment of the present invention.
Figure 5:
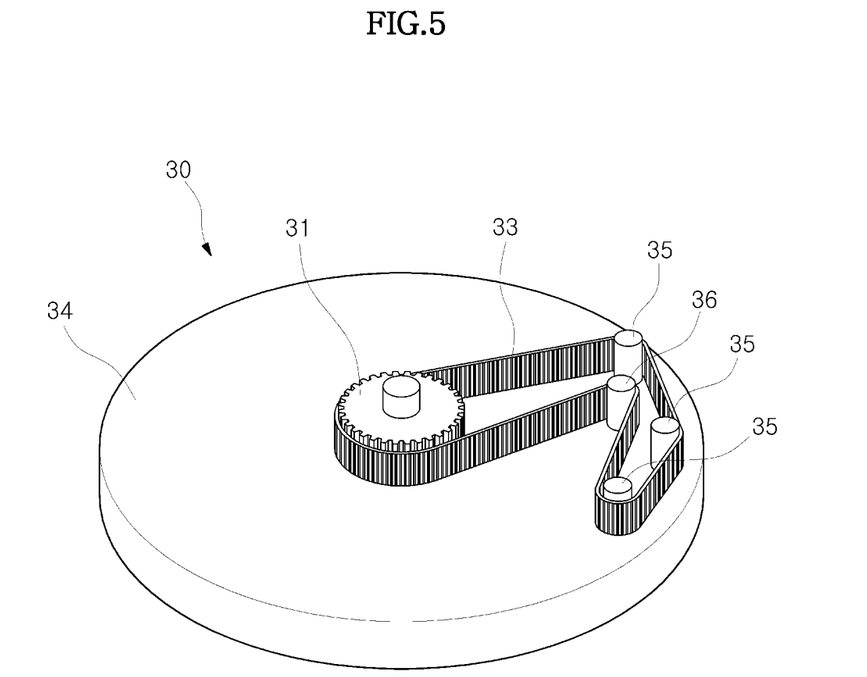
FIG. 5 is a perspective view schematically illustrating a belt support part of the belt planetary gear part in accordance with an embodiment of the present invention.

FIG. 3 is a side cross-sectional view schematically illustrating a coupling state of the belt planetary gear part of the electronic parking brake in accordance with an embodiment of the present invention, and FIG. 4 is a perspective view schematically illustrating a coupling state of the belt planetary gear part of the electronic parking brake in accordance with an embodiment of the present invention, and FIG. 5 is a perspective view schematically illustrating a belt support part of the belt planetary gear part in accordance with an embodiment of the present invention.

As illustrated in the drawings, the belt planetary gear part 30 of the electronic parking brake 1 according to an embodiment of the present invention includes a solar gear 31, a ring gear 32, a belt gear 33, and a transmission plate 34.

The belt planetary gear part 30 operates based on the principle that is similar to that of a conventional differential planetary gear part in which a rotational force may be decelerated and amplified. The conventional differential planetary gear part has a coupling structure in which a solar gear and a planetary gear are directly meshed with each other and the planetary gear is meshed with a fixed ring gear and is decelerated. On the other hand, the belt planetary gear part 30 according to an embodiment of the present invention has a coupling structure in which the solar gear 31 is connected to the belt gear 33 and the belt gear 33 is meshed with the fixed ring gear 32 and operates so that the rotational force is decreased and amplified.

Thus, the belt gear 33 instead of a planetary gear directly meshed with a conventional solar gear, transfers power so that noise and vibration caused by friction may be remarkably reduced. Also, a length of the belt gear 33 and the number of teeth on an outer surface of the belt gear 33 may be easily adjusted so that a degree of freedom of a design of a space or volume when a design is secured.

The solar gear 31 receives the rotational force generated by the motor 10 from the first decelerator part 20. Teeth are formed on an outer circumferential surface of the solar gear 31, and the number of teeth may be selectively adjusted by adjusting a deceleration ratio.

The belt gear 33 is connected to the solar gear 31 and transfers power. Teeth are disposed on both surfaces of the belt gear 33 so that the belt gear 33 may be meshed with the solar gear 31 and may be meshed with and connected to a belt support part 35 and/or the ring gear 32 that will be described later. The belt gear 33 is operably connected to the solar gear 31 using the belt support part 35 that will be described later and transfers power to the transmission plate 34.

Meanwhile, the belt gear 33 may be made of a rubber or plastic material.

The transmission plate 34 receives the rotational force of the motor 10 from the belt gear 33 and is disposed as a rotatable plate to output the decelerated and amplified rotational force. In this case, the transmission plate 34 is rotated about the same axis as that of the solar gear 31, and power is transferred to the transmission plate 34 using the belt gear 33 in a state in which the transmission plate 34 does not contact the solar gear 31.

The transmission plate 34 includes the belt support part 35 that supports the belt gear 33 so that the transmission plate 34 may be connected to the belt gear 33 that receives power from the solar gear 31, and a tension adjustment part 36 that provides tension to the belt gear 33. The transmission plate 34 is rotated by power transferred to the belt support part 35 through the belt gear 33.

The belt support part 35 having a cylindrical shape is disposed to protrude outward from one surface of the transmission plate 34, and a plurality of belt support parts 35 may be disposed to be spaced from one another. In this case, at least one of the plurality of belt support parts 35 needs to be installed to be close to an edge of the transmission plate 34. This is because the belt support parts 35 need to support the belt gear 33 to be engaged with the ring gear 32 that will be described later.

The belt support parts 35 are coupled to and fixed to the transmission plate 34. Thus, when the belt gear 33 is rotated, the belt gear 33 slides on the belt support parts 35 and is movable. Meanwhile, the belt support parts 35 may also be installed to be fixed to the transmission plate 34 and to be rotated from the transmission plate 34. Thus, when the belt gear 33 is rotated, the belt support parts 35 are rotated by movement of the belt gear 33, and the transmission plate 34 is rotated.

The tension adjustment part 36 adjusts tension when the belt gear 33 transmits power so that efficiency of power transmission may be improved. The tension adjustment part 36 is disposed to press an outer surface of the belt gear 33 inward so that the belt gear 33 and the belt support parts 35 may be connected to be in close contact with each other. A plurality of tension adjustment parts 36 may also provided to adjust tension.

Meanwhile, although a structure in which the tension adjustment part 36 is moved a predetermined distance from the transmission plate 34 and adjusts tension and a drawing thereof are not shown, the structure for adjusting tension of a belt is a well-known technology, and thus, a detailed description thereof will be omitted.

The ring gear 32 is disposed inside a housing (not shown) of the belt planetary gear part 30, and a predetermined portion of the ring gear 32 is meshed with the above-described belt gear 33 so that the rotational force transferred from the solar gear 31 may be transferred to the transmission plate 34. Teeth are disposed in an inside of the ring gear 32 and are meshed with an outside of the belt gear 33. Thus, when the belt gear 33 is rotated, the belt planetary gear part 30 is moved along the ring gear 32 to which the belt gear 33 is fixed, so that the transmission plate 34 may be rotated.

The above-described belt planetary gear part 30 is disposed so that the solar gear 31, the belt gear 33, the belt support parts 35, and the ring gear 32 may be compactly coupled to one another on the same plane without an increase in volume.

Meanwhile, the belt support parts 35 may be disposed so that teeth may be formed on outer circumferential surfaces of the belt support parts 35 and thus the rotational force may be more easily transferred to the transmission plate 34. Such an embodiment is illustrated in FIG. 6.

Figure 6:
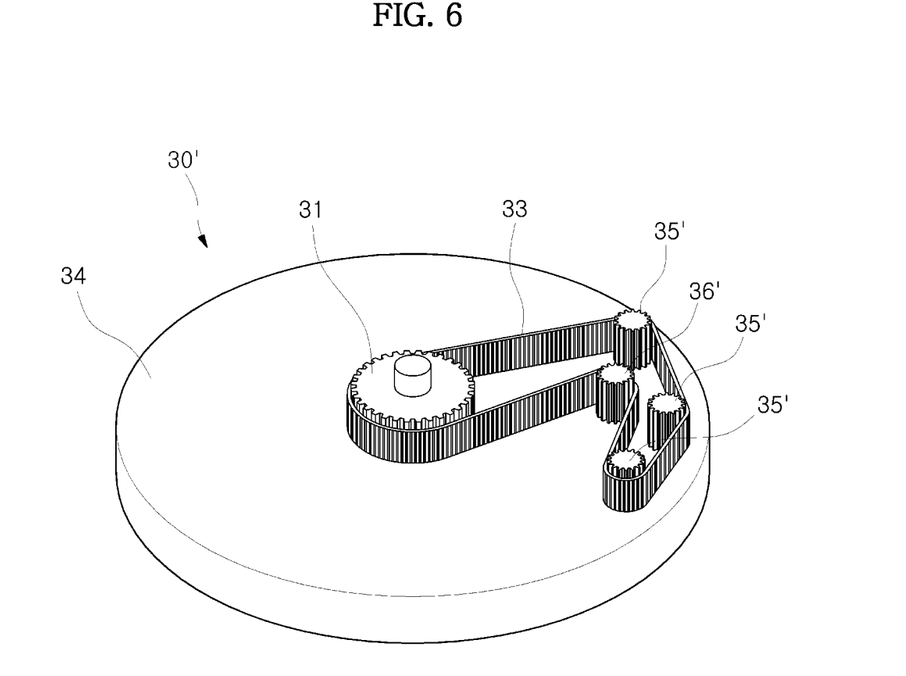
FIG. 6 is a perspective view schematically illustrating a belt support part of a belt planetary gear part in accordance with another embodiment of the present invention.

FIG. 6 is a perspective view schematically illustrating a belt support part of a belt planetary gear part in accordance with another embodiment of the present invention. Here, the same reference numerals as those of the previous drawings denote elements having the same functions.

Referring to FIG. 6, a belt planetary gear part 30' according to the embodiment includes belt support parts 35' each having an outer circumferential part on which teeth are formed. The belt support parts 35' are fixed to the transmission plate 34 and is installed to be rotatable from the transmission plate 34. Thus, the belt support parts 35' are engaged with an inside of the belt gear 33, rotated and revolved by the belt gear 33, and rotates the transmission plate 34. In this case, teeth are also formed on an outer circumferential surface of a tension adjustment part 36' so that the tension adjustment part 36' may adjust tension stably in a state in which the tension adjustment part 36' is engaged with the belt gear 33.

Figure 7:
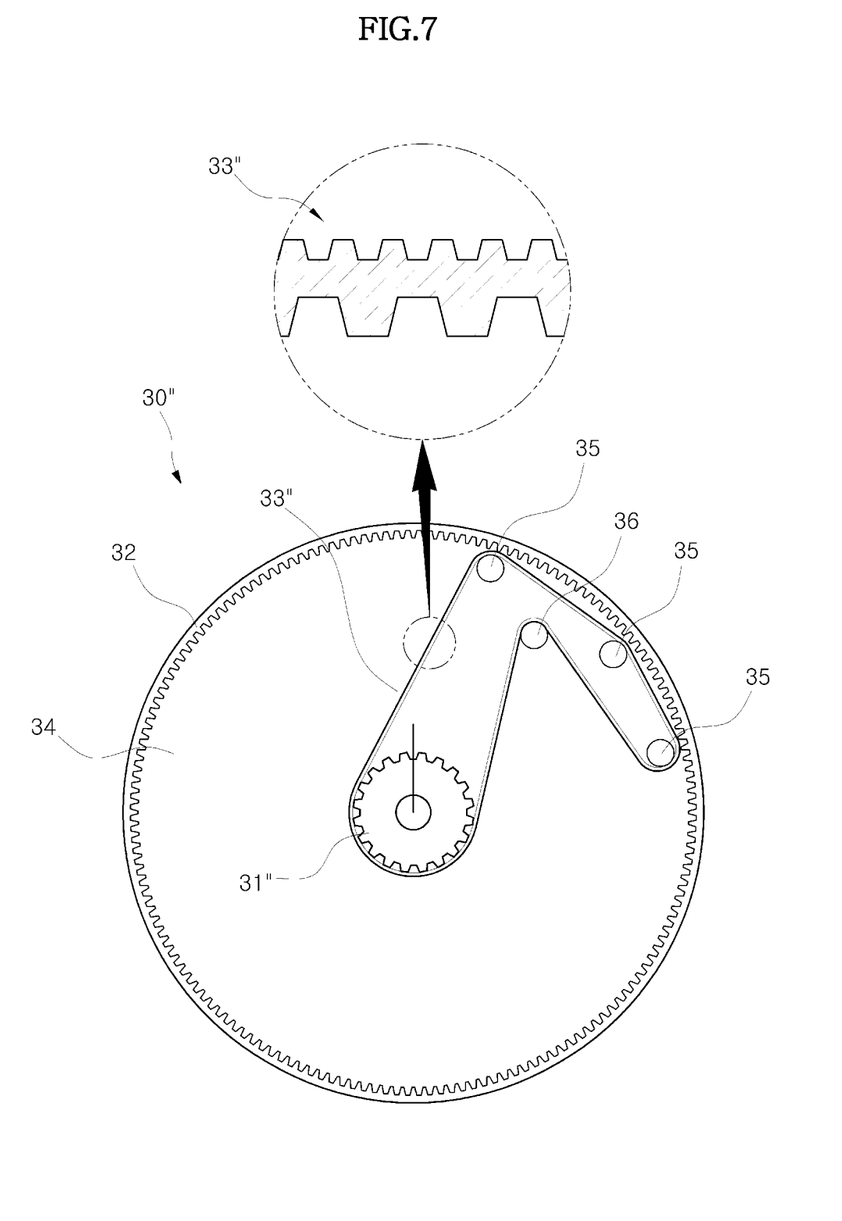
FIG. 7 is a plan view schematically illustrating a belt planetary gear part in accordance with still another embodiment of the present invention.

FIG. 7 is a plan view schematically illustrating a belt planetary gear part in accordance with still another embodiment of the present invention. Here, the same reference numerals as those of the previous drawings denote elements having the same functions.

A belt planetary gear part 30" according to the embodiment has a structure in which an interval between teeth is adjusted so that a deceleration ratio may be adjusted. As illustrated in FIG. 7, teeth formed on an inside and an outside of a belt gear 33" are disposed to have different intervals therebetween. In this case, in order to smoothly transmit power, the teeth formed on a solar gear 31" need to be formed to be engaged with the teeth formed on the inside of the belt gear 33", and the teeth formed on the ring gear 32 need to be engaged with the teeth formed on the outside of the belt gear 33". In this case, since a deceleration ratio is designed as "i=1+(the number of teeth on the solar gear 31"/the number of teeth on the ring gear 32)", the number of teeth on the solar gear 31" or the ring gear 32 is selectively increased/decreased according to a required deceleration ratio, and an interval of the teeth formed on the belt gear 33" is adjusted and thus, the required deceleration ratio may be provided so that the belt gear 33" may be engaged with the solar gear 31" or the ring gear 32.

Then, a decelerated and rotated operating state of the belt planetary gear part 30 of the electronic parking brake 1 according to an embodiment of the present invention will be described with reference to FIG. 8.

Figure 8:
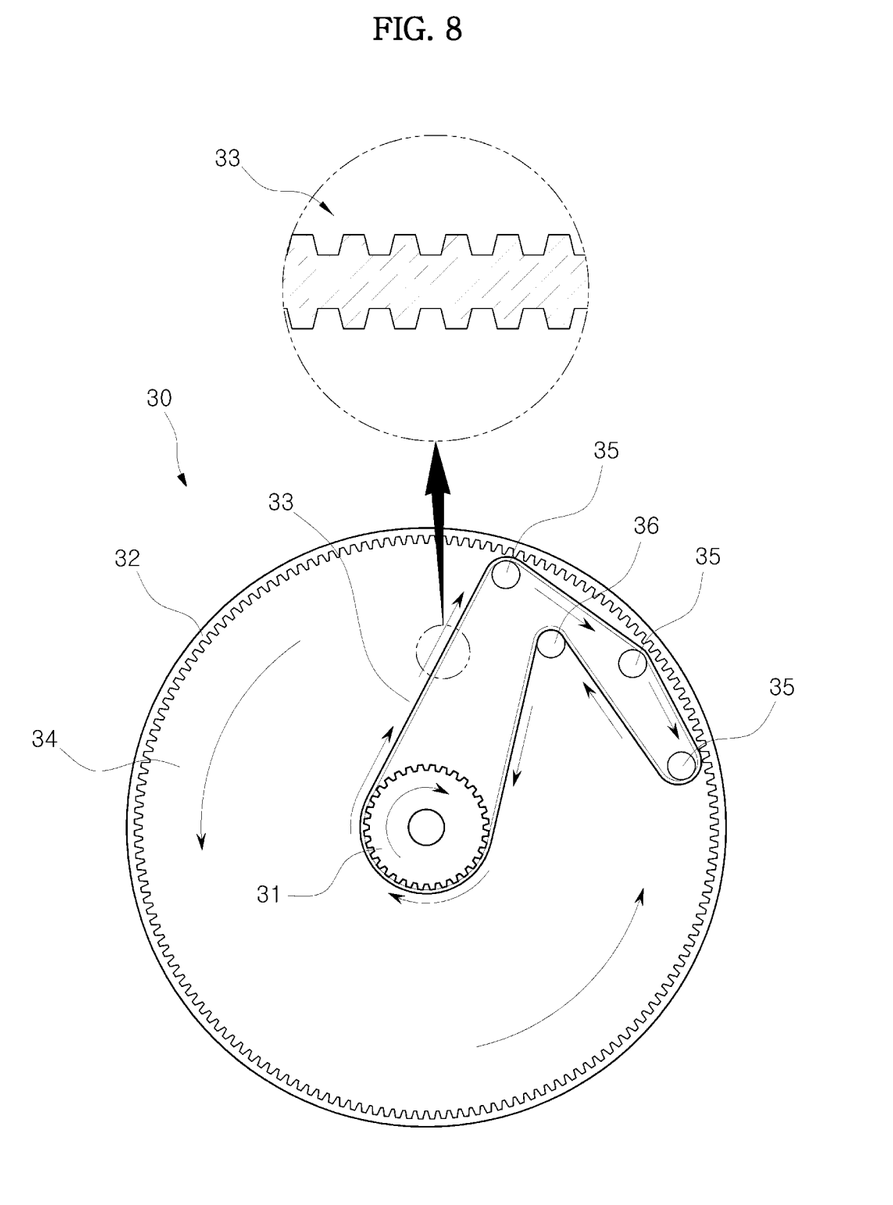
FIG. 8 is a plan view schematically illustrating an operating state of the belt planetary gear part of the electronic parking brake in accordance with an embodiment of the present invention.

Referring to FIG. 8, the solar gear 31 of the belt planetary gear part 30 receives a rotational force and is rotated. Thus, the rotational force of the solar gear 31 is transferred to the belt gear 33 connected to the solar gear 31 so that the belt gear 33 may be rotated in the same direction as a rotation direction of the solar gear 31.

The belt gear 33 is supported by the belt support parts 35, is disposed to be in close contact with the ring gear 32 and the belt support parts 35, and is rotated between the belt support parts 35 and the ring gear 32 by rotation of the solar gear 31.

In this case, the outside of the belt gear 33 is engaged with the ring gear 32 so that the belt gear 33 has a pushing force. That is, the rotating belt gear 33 pushes the belt support parts 35 in an opposite direction to the rotation direction of the belt gear 33 by an action/reaction force with the fixed ring gear 32.

Thus, the belt support parts 35 are fixed and coupled to the transmission plate 34 so that a force applied to the belt support parts 35 is used to rotate the transmission plate 34. Thus, the transmission plate 34 has the same rotation central axis as that of the solar gear 31 but a rotation direction of the transmission plate 34 is reversely decelerated so that the transmission plate 34 may be rotated and the rotational force of the transmission plate 34 is output to an output shaft (see 37 of FIG. 3) disposed on a bottom surface of the transmission plate 34. However, in FIG. 3, the output shaft 37 is disposed in the center of the bottom surface of the transmission plate 34. However, the present invention is not limited thereto, and the output shaft 37 may be disposed in various positions and shapes according to the type of the second decelerator part 40.

As described above, the rotational force output by the transmission plate 34 may be transferred to the conversion unit 50 through the second decelerator part 40 or may be transferred directly to the conversion unit 50. The conversion unit 50 may convert the received rotational force into a rectilinear motion so that braking of the vehicle may be performed.

Consequently, the belt planetary gear parts 30, 30', and 30" according to the present invention are configured to be transferred by the belt gear 33 formed of a rubber or plastic material (not through power transmission by meshing of metal gears) so that vibration and noise that occur in the decelerators 20, 30, and 40 may be remarkably reduced compared to the conventional differential planetary gear part.

Thus, the electronic parking brake 1 to which the belt planetary gear parts 30, 30', and 30" are applied, may improve a driver's braking feeling and vehicle braking performance.

As described above, an electronic parking brake according to an embodiment of the present invention includes a decelerator that implements an operation of a planetary gear to which a belt is applied, so that operating noise can be reduced.

Also, a compact coupling structure is provided and simultaneously, spatial utility can be improved so that the electronic parking brake can be installed regardless of a capacity of a vehicle.

Furthermore, an interval between teeth formed on an inside and an outside of a belt gear that is engaged with a solar gear and a ring gear is selectively increased/decreased so that a required deceleration ratio can be easily provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake comprising:
a carrier fixed to a body of a vehicle;
a caliper housing that is slidably installed in the carrier;
a motor that is disposed at an outside of the caliper housing and generates a rotational force;
a decelerator that amplifies the rotational force of the motor; and
a conversion unit that converts a rotational force transmitted from the decelerator into a rectilinear motion, wherein the decelerator comprises a belt planetary gear part, and the belt planetary gear part comprises:
a solar gear rotated by receiving the rotational force of the motor;
a belt gear engaged with the solar gear;
a transmission plate that is connected to the belt gear and has belt support poles for supporting the belt gear so that the belt gear is rotatable; and
a ring gear that is engaged with an outer surface of the belt gear and engaged with the belt gear to rotate the transmission plate,
wherein at least a portion of the ring gear is arranged radially inward of a portion of the transmission plate,
wherein each of the belt support poles has a solid cylindrical shape having a smooth side surface so that a horizontal cross-section of each of the belt support poles has a circular shape, and
wherein teeth are formed on an inside and an outside of the belt gear, and an interval dimension between the teeth formed on the inside and the outside of the belt gear is different from each other.

2. The electronic parking brake of claim 1, wherein the transmission plate further comprises a tension adjustment part that presses an outer surface of the belt gear inward to provide tension to the belt gear.

3. The electronic parking brake of claim 1, wherein the interval dimension between the teeth formed on the inside and the outside of the belt gear is selected based on a required gear ratio.

4. The electronic parking brake of claim 1, wherein the belt support poles are fixed to the transmission plate, and the belt gear slides on the belt support poles, is rotated, and transfers a rotational force to the transmission plate when the belt gear operates.

5. The electronic parking brake of claim 1, wherein the belt support poles are fixed to the transmission plate and are disposed to be rotatable from the transmission plate, and the belt gear is engaged with the belt support poles, is rotated, and transfers a rotational force to the transmission plate when the belt gear operates.

* * * * *